United States Patent
Otsuka et al.

(10) Patent No.: US 6,761,951 B2
(45) Date of Patent: Jul. 13, 2004

(54) SYNTHETIC QUARTZ GLASS BLANK

(75) Inventors: Hisatoshi Otsuka, Niigata-ken (JP); Kazuo Shirota, Niigata-ken (JP); Akira Fujinoki, Koriyama (JP); Hiroyuki Nishimura, Koriyama (JP); Takayuki Shimakawa, Koriyama (JP)

(73) Assignees: Shin-Etsu Chemical Co., Ltd., Tokyo (JP); Shin-Etsu Quartz Products Co., Ltd., Tokyo (JP)

(*) Notice: Subject to any disclaimer, the term of this patent is extended or adjusted under 35 U.S.C. 154(b) by 0 days.

(21) Appl. No.: 10/315,990

(22) Filed: Dec. 11, 2002

(65) Prior Publication Data

US 2003/0138587 A1 Jul. 24, 2003

(30) Foreign Application Priority Data

Dec. 11, 2001 (JP) ........................................ 2001-376646

(51) Int. Cl.[7] .............................................. B32B 3/00
(52) U.S. Cl. ...................................... 428/64.1; 428/364
(58) Field of Search ................................ 428/64.1, 364

(56) References Cited

U.S. PATENT DOCUMENTS

| | | | |
|---|---|---|---|
| 5,790,315 A | 8/1998 | Fujinoki et al. | |
| 5,970,746 A | 10/1999 | Fujinoki et al. | |
| 6,209,354 B1 | 4/2001 | Fujinoki et al. | |

FOREIGN PATENT DOCUMENTS

| | | |
|---|---|---|
| EP | 0 673 888 A1 | 9/1995 |
| EP | 0735006 | 10/1996 |
| EP | 0870737 | 10/1998 |
| EP | 1033350 | 9/2000 |
| EP | 1063203 | 12/2000 |
| EP | 1067096 | 1/2001 |
| EP | 1329429 | 7/2003 |
| JP | 1-212247 A | 8/1989 |
| JP | 2-102139 A | 4/1990 |
| JP | 2-239127 A | 9/1990 |
| JP | 5-58667 A | 9/1993 |
| JP | 7-61823 A | 3/1995 |
| JP | 7-267662 A | 10/1995 |

OTHER PUBLICATIONS

A. E. Geissberger et al., The American Physical Society, vol. 28, No. 6, pp. 3266–3271 (Sep. 15, 1983).

Khotimchenko et al., Journal: Zhurnal Prikladnoi Spektroskopii, vol. 46, No. 6, pp. 987–991 (Jun. 1987) (with English abstract).

*Primary Examiner*—Alexander S. Thomas
(74) *Attorney, Agent, or Firm*—Birch, Stewart, Kolasch & Birch, LLP

(57) ABSTRACT

A cylindrical, chlorine-free synthetic quartz glass blank of a specific size obtained by homogenizing a synthetic quartz glass ingot having periodic striae along a direction of growth has (a) striae grades in the working and off-axis directions which meet grade A of U.S. military specification MIL-G-174B, (b) average hydroxyl group concentrations in the working and off-axis directions of 700 to 1,000 ppm each, (c) average fictive temperatures in the working and off-axis directions of 850 to 950° C. each, and (d) a refractive index distribution for 633 nm wavelength light in the working direction of at most $1 \times 10^{-6}$. The blank has a good transmittance to laser light, undergoes little deterioration when irradiated with laser light, and is particularly suitable for ArF excimer laser-related applications.

6 Claims, 2 Drawing Sheets

AVERAGE OH VALUE AT x = -4
(OH GROUP CONCENTRATION
AVERAGED IN OFF-AXIS DIRECTION AT
THE -4 cm POSITION IN WORKING DIRECTION)

SYNTHETIC QUARTZ GLASS BLANK

This nonprovisional application claims priority under 35 U.S.C. §119(a) on Patent Application No. 2001-376646 filed in JAPAN on Dec. 11, 2001, which is herein incorporated by reference.

BACKGROUND OF THE INVENTION

1. Field of the Invention

The present invention relates to synthetic quartz glass blanks having a good transmittance and low deterioration during laser irradiation from which can be obtained optical elements such as lenses, prisms, mirrors and windows for use with excimer lasers, and particularly ArF excimer lasers.

2. Prior Art

Higher levels of integration in VLSI circuits have led to exposure patterns of increasingly small linewidth. This has created a need for exposure light sources of shorter wavelength in the lithography systems used to form circuit patterns on semiconductor wafers. The i-line (wavelength, 365 nm), once the light source of choice in lithography steppers, has been largely supplanted by the KrF excimer laser (248 nm), and today ArF excimer lasers (193 nm) are starting to see industrial use.

This trend toward shorter wavelength light sources has also created a need for higher precision in the optical components (e.g., lenses, windows, prisms) used in exposure tools. Some of the many important concerns that exist regarding such components, particularly when used with ArF excimer lasers, include refractive index homogeneity, improving the transmittance and reducing the scattering of laser light, and stability to excimer laser irradiation.

Of these concerns, the refractive index homogeneity Δn is the most critical and most difficult to achieve. The hydroxyl group concentration and its distribution have a large influence on the refractive index distribution in quartz glass. That is, a hydroxyl group concentration of 10 ppm reportedly narrows the refractive index distribution in quartz glass by $1\times10^{-6}$. It can readily be seen from this that a very high-homogeneity synthetic quartz glass body having a hydroxyl group concentration distribution of only 10 ppm would be needed to obtain a synthetic quartz glass blank in which $\Delta n = 1\times10^{-6}$.

Two methods are commonly used for making synthetic quartz glass: a direct method in which a silica-forming starting material is flame hydrolyzed, forming fine particles of silica which are then melted and deposited to effect growth; and a soot method in which a silica-forming starting material is flame hydrolyzed, forming fine particles of silica which are deposited to effect growth, then later vitrified to form a clear glass. However, obtaining a synthetic quartz glass body of such high homogeneity directly by either of these methods is technically very difficult. To obtain a synthetic quartz glass body of higher homogeneity, it is thus necessary to subject the synthetic glass ingot obtained by either method to homogenizing treatment.

The most efficient and effective way to homogenize quartz glass is to carry out the zone melting process disclosed in JP-A 7-267662 in the ingot growth direction and in a direction perpendicular thereto. This approach has a number of advantages. For example, the molten portion of the ingot is mechanically agitated, enabling efficient homogenization to be carried out and thus making it possible to narrow, for example, the distribution in the hydroxyl group concentration. In addition, during homogenization, the quartz glass ingot is treated without being brought into contact with anything other than the burner flame, minimizing the diffusion of external impurities to the ingot and thus holding down the decline in UV light transmittance.

Generally, when homogenizing treatment by a zone melting process is used to improve the uniformity of the hydroxyl group concentration, a wider variation in hydroxyl group concentration prior to such treatment results in less efficient homogenization. The efficiency of homogenization declines also with increasing hydroxyl group concentration. At higher hydroxyl group concentrations in particular, the variation in concentration is generally wider, detracting even further from the efficiency of homogenization. For this reason, a hydroxyl group concentration of 1,000 ppm or less is preferred in synthetic quartz glass ingots subjected to homogenization.

Other properties which, like the refractive index homogeneity Δn, are of critical importance in synthetic quartz glass blanks for optical elements used in ArF excimer laser exposure systems, are the transmittance of the glass to UV light and its stability to laser irradiation.

The most important transmittance to UV light is the transmittance to the 193 nm wavelength light used in an ArF excimer laser. The transmittance of quartz glass to light at this wavelength decreases as the content of impurities rises. Typical impurities include alkali metals such as sodium, and other metallic elements such as copper and iron. By using a silane or silicone starting material of very high purity to produce the synthetic quart glass, the concentration of such metallic impurities present within the quartz glass can be brought down to below the level of detection by a highly sensitive detector (<1 ppb). However, because sodium and copper have relatively large coefficients of diffusion to quartz glass, the diffusion and admixture of such external impurities often occurs during homogenization and heat treatment. Special care must be taken to avoid such contamination during these treatment operations.

Stability of the quartz glass to excimer laser irradiation is a very important factor, particularly as an ArF excimer laser reportedly causes five times more damage than a KrF excimer laser.

When quartz glass is irradiated with ArF excimer laser light, one effect that arises is the cleavage of Si—O—Si bonds by the very intense energy of the light, forming the paramagnetic defects commonly known as E' centers which absorb 215 nm light. Another effect, commonly referred to as "laser compaction," is a rearrangement of the network structure of quartz glass that increases the density of the glass.

The former effect lowers the transmittance of the quartz glass to 193 nm light, and the latter effect raises the refractive index and increases the birefringence. All of these changes in optical characteristics are undesirable for an exposure system.

It is known that reducing the number of intrinsic defects in quartz glass and setting the hydrogen concentration in the glass to at least a certain level are both highly effective for improving the stability of the quartz glass to laser irradiation.

Intrinsic defects present in quartz glass include defects characterized by too much or too little oxygen for the Si—O—Si structure making up the quartz glass. Well-known examples include oxygen deficient defects (Si—Si, which absorbs at 245 nm) and oxygen surplus defects (Si—O—O—Si, which absorbs at 177 nm). However, such defects, or at least those which are measurable by spectrophotometric means, are excluded from optical-grade synthetic quartz glass to begin with. Of greater concern are more subtle defects, such as those in which the Si—O—Si bond angle falls outside the range of stability, as in the case of excessively stretched or compressed Si—O—Si bonds.

To remove such unstable structures, JP-A 7-61823 discloses a process in which the growth rate of quartz glass produced by the direct method is held to a level of not more than 2 mm per hour.

Although this process does appear to work, because the growth rate is very slow, it has a poor productivity and is not very cost-effective. Moreover, with regard to the general production conditions, it is empirically known that a slow growth rate tends to increase the hydroxyl group concentration in the resulting quartz glass. Two examples are cited in JP-A 7-61823, but the synthetic quartz glass obtained in both had hydroxyl group concentrations of 1,200 ppm, which is considerably higher than 1,000 ppm.

Because, as noted above, hydroxyl groups have a large impact on the refractive index of quartz glass, a lower hydroxyl group concentration is preferred for obtaining a more uniform refractive index distribution. Homogenization of the resulting quartz glass body is not called for in the art disclosed in JP-A 7-61823. However, in cases where homogenizing treatment is subsequently carried out to increase the uniformity of the refractive index, it is preferable for the hydroxyl group concentration to be no higher than 1,000 ppm. At a concentration above 1,000 ppm, the efficiency of homogenization declines, lengthening the length of time required for treatment. A longer treatment time increases the diffusion of external impurities into the quartz glass, thus lowering the transmittance of the glass, and also reduces the hydrogen concentration.

The fact that hydrogen molecules in the quartz glass inhibit damage to the glass by excimer laser irradiation is well-known in the art and has been the subject of active investigation ever since it was revealed in JP-A 1-212247.

There are two ways to include an appropriate level of hydrogen molecules in quartz glass. One method is to introduce hydrogen molecules into the growing ingot by suitably adjusting the ratio of hydrogen, propane and oxygen used as the combustion gases during growth of the quartz glass ingot. This approach allows the amount of hydrogen molecules that dissolve in the growing ingot to be adjusted within a range of about 0 to $2 \times 10^{19}$ molecules/cm$^3$.

The other method involves the thermal diffusion of hydrogen molecules by heat treating a quartz glass body within a hydrogen atmosphere. This method has the advantage of enabling strict control of the hydrogen molecule concentration. At the same time, it also has a number of significant disadvantages. Specifically, because it uses hydrogen gas, which is a highly flammable substance, there is a risk of explosion. Also, the associated equipment costs for safety and other purposes represent a substantial economic burden. In addition, heat treatment as in this case may allow impurities to diffuse into the quartz glass, which tends to lower the transmittance of the glass.

An important factor which affects the refractive index distribution of the quartz glass and governs the stability of the glass to ArF excimer laser irradiation is the "fictive temperature." This is a concept particular to glass, and refers to the temperature at which glass in a molten state, as it cools, undergoes a loss in the freedom of the molecules and solidifies. The physical value to which the fictive temperature relates is the density of the quartz glass.

Because the fictive temperature distribution of quartz glass is also, like the hydroxyl group concentration distribution, a major determinant of the refractive index distribution in the quartz glass, methods for holding the refractive index distribution Δn in a quartz glass body to $1 \times 10^{-6}$ or less by suitably combining the hydroxyl group concentration distribution and the fictive temperature distribution have been disclosed in JP-A 2-102139 and JP-A 2-239127.

We have found from our own research that the fictive temperature has a large influence on changes in the transmittance of quartz glass when irradiated with ArF excimer laser light. It thus became clear to us that the intrinsic defects present in quartz glass, its hydrogen concentration, and its fictive temperature are all important factors for enhancing the laser durability of the quartz glass. This will be discussed more fully later in the specification.

JP-A 2-102139 and JP-A 2-239127 devote attention to planarizing the refractive index distribution, and thus cite suitable ranges for the fictive temperature distribution. Yet, because nothing was known at the time about how the fictive temperature interacts with laser durability, the fictive temperature itself is not discussed. Hence, these prior-art disclosures do not resolve the technical issue addressed by the present invention; namely, how to improve both the refractive index distribution and the laser durability of synthetic quartz glass blanks.

JP-A 5-58667 teaches that the resistance of quartz glass to damage from excimer laser irradiation is enhanced by controlling the fictive temperature of the glass within a range of 800 to 1,000° C. However, as is apparent from the description given therein, JP-A 5-58667 is concerned with KrF excimer laser and not ArF excimer lasers. Hence, the fictive temperature range is broader. Quartz glass material intended for use in the production of optical elements for ArF excimer laser exposure systems must have an optimized fictive temperature.

SUMMARY OF THE INVENTION

It is therefore an object of the present invention to provide synthetic quartz glass blanks which have a good transmittance to laser light and minimal deterioration during laser irradiation, and are thus suitable for excimer laser-related applications, particularly ArF excimer laser-related applications.

We have discovered that synthetic quartz glass blanks endowed with characteristics (a) to (d) listed below provide optical elements which have a good transmittance and experience minimal deterioration, and can thus be used in excimer laser applications, particularly ArF excimer laser applications.

Accordingly, the invention provides a synthetic quartz glass blank which is obtained by homogenizing a synthetic quartz glass ingot having periodic striae in a direction of growth, has a generally cylindrical shape with a diameter of 150 to 380 mm and a thickness of 50 to 150 mm, and contains substantially no chlorine; wherein the blank has:

(a) striae grades in a working direction and an off-axis direction which meet grade A of U.S. military specification MIL-G-174B, (b) a working direction hydroxyl group concentration averaged in the off-axis direction and an off-axis direction hydroxyl group concentration averaged in the working direction of 700 to 1,000 ppm each, (c) a working direction fictive temperature averaged in the off-axis direction and an off-axis direction fictive temperature averaged in the working direction of 850 to 950° C. each, and (d) a refractive index distribution Δn for 633 nm wavelength light in the working direction of the synthetic quartz glass of at most $1\times10^{-6}$.

Preferably, the synthetic quartz glass blank of the invention, after irradiation with 30,000 pulses of ArF excimer laser light at an energy density per pulse of 2 mJ/cm² and a frequency of 200 Hz, has a laser light transmittance that is at least 98.0% of the transmittance prior to laser irradiation and, after irradiation with $2\times10^6$ pulses of ArF excimer laser light under the same conditions, has a transmittance of at least 97.5%.

The inventive synthetic quartz glass blank typically has an average hydrogen molecule concentration in the working direction of $2\times10^{17}$ to $3\times10^{18}$ molecules/cm³.

It is advantageous for the striae on the ingot from which the synthetic quartz glass blank of the invention is obtained to be distributed periodically in the growth direction to a density of at least one striae per centimeter and to be located preferably at positions where feeding of a silica-forming starting compound is interrupted during growth of the ingot.

The ingot from which the inventive blank is obtained is generally repeatedly homogenized in the growth direction and in a direction perpendicular to the growth direction.

BRIEF DESCRIPTION OF THE DRAWINGS

FIG. 1 illustrates the meanings of "working direction" and "off-axis direction.

DETAILED DESCRIPTION OF THE INVENTION

The objects, features and advantages of the invention will become more apparent from the following detailed description, taken in conjunction with the accompanying diagrams.

Definitions of terms used in this specification are provided below.

Working Direction and Off-Axis Direction

The optical elements most often used in exposure systems have a flat lens shape. In this case, referring to the synthetic quartz glass blank 20 shown in FIG. 1A, the direction facing the plane through which light passes is referred to herein as the "working direction," and the direction perpendicular to the working direction is referred to herein as the "off-axis direction." FIG. 1B shows the quartz glass blank 20 as seen from the working direction, and FIG. 1C shows the quartz glass blank 20 as seen from the off-axis direction.

Figure 1A:
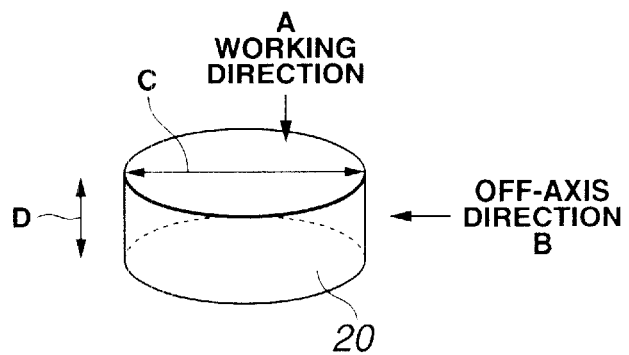
" FIG. 1A is a perspective view showing an example of a synthetic quartz glass blank.
Figure 1B:
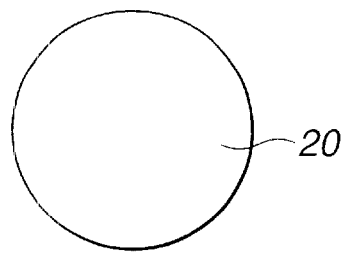
FIG. 1B is a view of the same blank from the working direction.
Figure 1C:
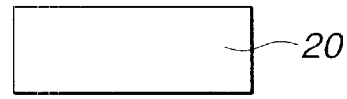
FIG. 1C is a view of the blank from the off-axis direction.

Here, the working direction is the direction indicated by arrow A in FIG. 1A; that is, the axial direction of the cylindrical blank. The off-axis direction is the direction indicated by arrow B; that is, a direction perpendicular to direction A. Thus, "working direction hydroxyl group concentration distribution" and "working direction fictive temperature distribution" refer respectively to the hydroxyl group concentration distribution and the fictive temperature distribution in the direction of arrow C in FIG. 1A, or the radial direction. Likewise, "off-axis direction hydroxyl group concentration distribution" and "off-axis direction fictive temperature distribution" refer respectively to the hydroxyl group concentration distribution and the fictive temperature distribution in the direction of arrow D, or the thickness direction.

Averaging in Off-Axis Direction

Figure 2:
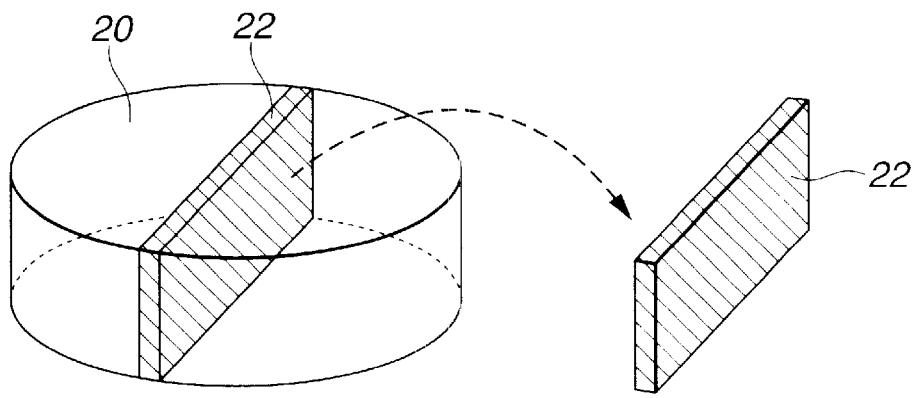
FIG. 2 illustrates the meaning of "averaging in the off-axis direction." The diagram is a perspective view showing how a slice is taken to obtain a quartz plate.

The phrase "averaging the working-direction hydroxyl group concentration in the off-axis direction" refers specifically to the following operation. As shown in FIG. 2, a generally cylindrical quartz glass blank 20 is thinly sliced along the working direction in an off-axis direction that passes through the center point of the blank 20 so as to form a thin quartz plate 22. Hydroxyl group concentrations on the quartz plate 22 are measured in the working direction, and positions along the working direction thereby correlated with hydroxyl group concentrations. Such measurements are carried out for the entire quartz plate. The individual hydroxyl group concentrations along the working direction at a given working-direction position are then averaged for that position, which means "averaging in the off-axis direction."

Figure 3:
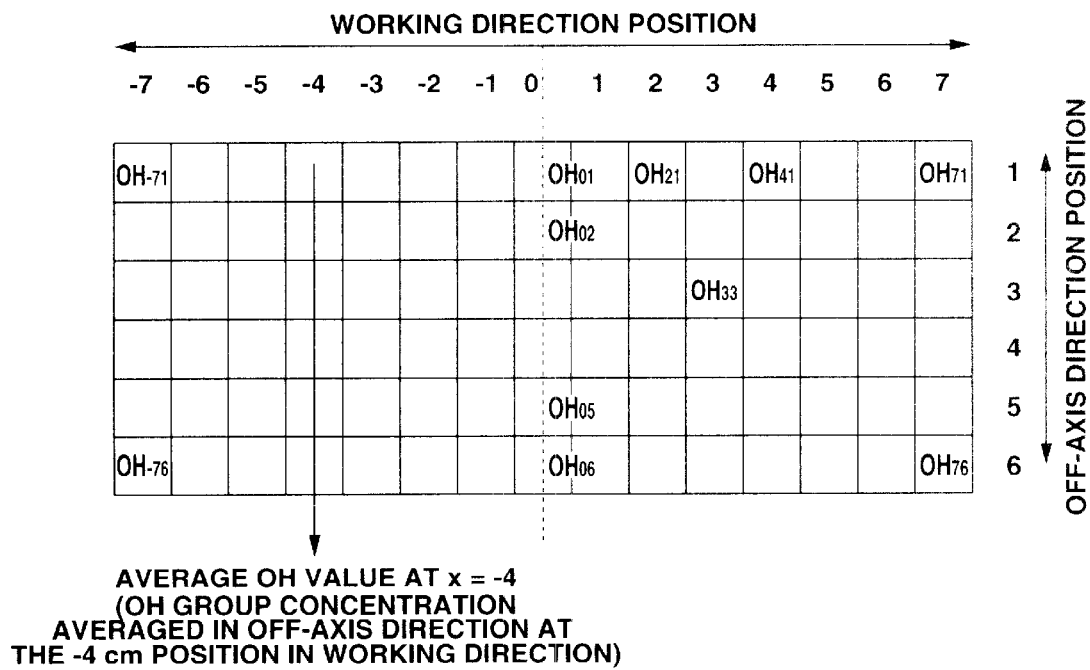
FIG. 3 is a diagram which uses the same quartz plate to illustrate how the hydroxyl group concentration in the working direction is averaged in the off-axis direction.

For example, in FIG. 3, the average value of $OH_{x=-4}$ in the off-axis direction is determined as follows:

Average $(OH_{x=-4})=(OH_{-41}+OH_{-42}+OH_{-43}+OH_{-44}+OH_{-45}+OH_{-46})/6$.

Similarly, "averaging in the working direction" refers to the operation of averaging individual values along the off-axis direction at a given position in the thickness direction.

Striae Grades

Striae grades are described in detail, together with the method of measurement, in U.S. military specification MIL-G-174B. Because MIL-G-174B is widely used for rating striae in optical glass, striae grades which conform to the same standards are employed in the present invention as well. Thus, "grade A," for example, refers herein to generally striae-free glass.

Ingot Growth Plane and Longitudinal Direction

The ingot has an elongated rotationally symmetric, or cylindrical, shape of circular cross-section. This circular cross-section is referred to herein as the "growth plane," and the direction of the axis about which the ingot is rotationally symmetric is called the "longitudinal direction."

The synthetic quartz glass blank of the invention is obtained by homogenizing a synthetic quartz glass ingot having periodic striae in a growth direction. The blank is substantially chlorine-free and has a generally cylindrical shape with a diameter of 150 to 380 mm, preferably 180 to 320 mm, and a thickness of 50 to 150 mm, preferably 50 to 100 mm. In addition, the blank has the following characteristics:

(a) striae grades in a working direction and an off-axis direction which meet grade A of U.S. military specification MIL-G-174B, (b) a working direction hydroxyl group concentration averaged in the off-axis direction and an off-axis direction hydroxyl group concentration averaged in the working direction of 700 to 1,000 ppm each, (c) a working direction fictive temperature averaged in the off-axis direction and an off-axis direction fictive temperature averaged in the working direction of 850 to 950° C. each, and (d) a refractive index distribution Δn for 633 nm wavelength light in the working direction of the synthetic quartz glass of at most $1\times10^{-6}$.

At a hydroxyl group concentration less than 700 ppm, the initial resistance of the synthetic quartz glass to damage from laser irradiation deteriorates. On the other hand, at a concentration greater than 1,000 ppm, the refractive index homogeneity declines, increasing ingot production costs. At a fictive temperature below 850° C., annealing takes a long time and the hydrogen concentration is difficult to control, leading to a wider hydrogen concentration distribution. At a fictive temperature above 980° C., the initial resistance to laser irradiation declines. At a Δn value larger than $1 \times 10^{-6}$, aberration in a lithography lens made from the blank becomes excessive.

As described above, the synthetic quartz glass blank of the invention is obtained by homogenizing a synthetic quartz glass ingot having periodic striae in a growth direction. The reason is as follows. The presence of defects expressed by chemical formulas, such as oxygen deficiency defects (Si—Si) and oxygen surplus defects (Si—O—O—Si), basically poses no obstacle to attaining a practical level of stability to ArF excimer laser irradiation in synthetic quartz glass materials from which optical elements for such applications as ArF excimer laser exposure systems are to be made. However, it is necessary to heal very subtle defects in which the Si—O—Si bond angle lies outside the range of stability, such as highly stretched or compressed Si—O—Si bonds. One known way of doing so is a process in which growth is carried out very slowly by setting the growth rate during quartz glass production to less than 2 mm per hour. As already noted, this approach has two drawbacks: productivity is low, resulting in poor cost-effectiveness, and the glass thus produced has a hydroxyl group concentration in excess of 1,000 ppm.

We have discovered that one effective way to overcome this problem is to use a process in which periodic striae are deliberately formed in the growth direction by growing the quartz glass ingot at a relatively fast growth rate, but periodically interrupting the supply of the starting material and allowing the growing end of the ingot to be thoroughly heated in an oxyhydrogen or other flame.

The term "striae" refers herein to areas of the ingot where the glass undergoes a large change in refractive index over a short distance. Sudden changes in hydroxyl group concentration and density reportedly occur at the striae, which are thus points of abrupt structural change. We have found that by deliberately creating such points of structural discontinuity during growth of the quartz glass and concentrating in these areas very subtle defects of the type mentioned above in which the Si—O—Si bond angle lies outside the range of stability, such as excessively stretched or compressed Si—O—Si bonds or Si—O—Si bonds, molecular bonds in the layers between the striae can be stabilized.

The density of the striae is very important for assuring the stability of layers between adjacent striae. We have found a striae density in the direction of ingot growth of at least one stria, and preferably one to four striae, to be desirable.

Moreover, the deliberate creation of such striae has made it possible to grow ingots at a higher speed. The growth rate of ingots is very closely associated with their diameter. Yet, by using the above-described process, a 140 mm diameter ingot grown at a rate of about 10 to 20 mm per hour which is subjected to homogenization treatment then annealed will yield a quartz glass body having a laser durability comparable to that of synthetic quartz glass grown by a conventional process at a rate of 2 mm or less per hour.

Synthetic quartz glass obtained at a relatively high growth rate under such production conditions has a relatively low hydroxyl group concentration. This makes it easy to hold the hydroxyl group concentration of a quartz glass body obtained at the above growth rate to a level of not more than 1,000 ppm and to adjust the hydroxyl group concentration within the range at which homogenization treatment by a zone melting process is most efficient. It also makes it easy to achieve the hydrogen concentration required for good laser durability.

Synthetic quartz glass ingots having such striae can be produced by a method in which a silica-forming starting compound is supplied to an oxyhydrogen flame, the compound is subjected to vapor phase hydrolysis or oxidative decomposition in the flame so to form fine particles of silica, and the silica particles are deposited on a target and concurrently melted and vitrified to form the ingot. During this process, supply of the silica-forming starting compound is interrupted at predetermined time intervals, thereby forming striae in the ingot which correspond to the interruptions in supply.

The silica-forming starting compound used in the foregoing process is an organosilicon compound. Preferred examples include chlorine-free silane compounds and siloxane compounds of general formula (1), (2) or (3) below:

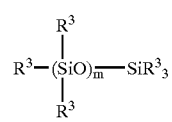

(2)

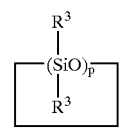

(3)

In the above formulas, $R^1$ and $R^2$ are like or unlike aliphatic monovalent hydrocarbon groups; $R^3$ is a hydrogen atom or an aliphatic monovalent hydrocarbon group; the letter m is at least 1, and preferably 1 or 2; the letter n is an integer from 0 to 3; and the letter p is an integer from 3 to 5.

Illustrative examples of the aliphatic monovalent hydrocarbon groups represented by $R^1$, $R^2$ and $R^3$ include $C_{1-4}$ alkyls such as methyl, ethyl, propyl, n-butyl and tert-butyl; $C_{3-6}$ cycloalkyls such as cyclohexyl; and $C_{2-4}$ alkenyls such as vinyl and allyl.

Specific examples of suitable silane compounds of above general formula (1) include $Si(OCH_3)_4$, $Si(OCH_2CH_3)_4$ and $CH_3Si(OCH_3)_3$. Specific examples of suitable siloxane compounds of above general formula (2) or (3) include hexamethyldisiloxane, hexamethylcyclotrisiloxane, octamethylcyclotetrasiloxane and decamethylcyclopentasiloxane.

A quartz burner that forms the oxyhydrogen flame is supplied with the silane or siloxane compound starting material, a combustible gas such as hydrogen, carbon monoxide, methane or propane, and a combustion-supporting gas such as oxygen.

Figure 4:
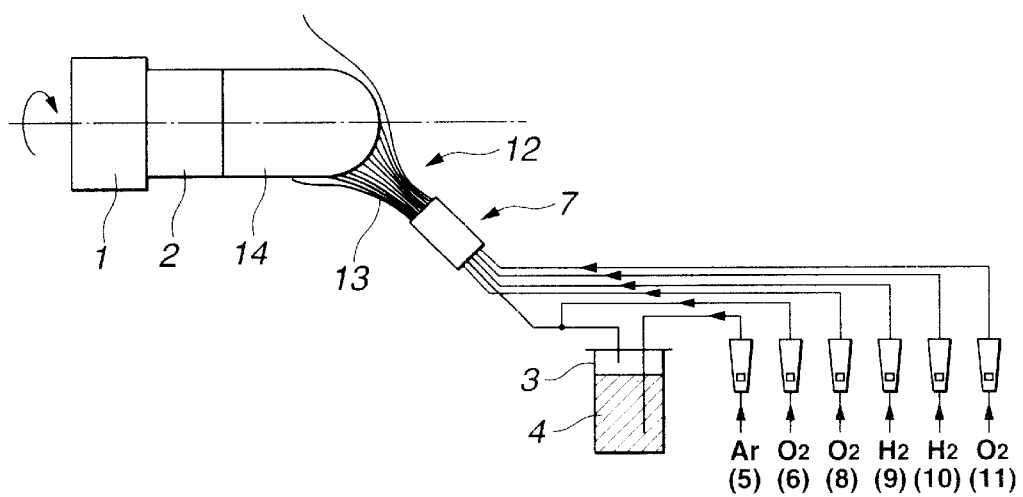
FIG. 4 is a schematic diagram showing an example of an apparatus for producing synthetic quartz glass.

The apparatus used to produce the synthetic quartz glass ingot may have a vertical construction or a horizontal construction like that shown in FIG. 4.

The synthetic quartz glass ingot has an internal transmittance at a wavelength of 193.4 nm which is preferably at least 99.70%. This is because, when the synthetic quartz glass ingot is ultimately used in the form of optical elements, the quartz glass will sometimes be required to have an internal transmittance at the particular wavelength in use, such as 193.4 nm in the case of an ArF excimer laser, of at least 99.70%. At an internal transmittance of less than 99.70%, when the ArF excimer laser light passes through a quartz glass element, light energy is absorbed and converted to heat energy, which may cause changes in the density of the glass and may also alter its refractive index. For instance, use as a lens material for an exposure system which employs an ArF excimer laser as the light source may give rise to undesirable effects such as distortion of the image plane due to changes in the refractive index of the lens material.

For this reason, it is desirable for the silica-forming starting compound and oxygen fed to the burner to have a molar mixing ratio which represents at least 1.3 times, and preferably 2.0 to 3.0 times, the stoichiometric amount of oxygen.

The molar ratio of the actual amount of oxygen to the stoichiometric amount of oxygen required by the silica-forming starting compound (a silane or siloxane compound) and hydrogen fed to the burner is preferably from 0.6 to 1.3, and most preferably from 0.7 to 0.9.

The vitrification temperature has a temperature distribution at the growth face. By setting the minimum temperature at this time to at least 1,800° C., and preferably at least 2,000° C. (with an upper limit of up to 2,500° C., and preferably up to 2,400° C.), it is possible to enlarge the region in which the internal transmittance of the synthetic quartz glass at a wavelength of 193.4 nm is held at a minimum of 99.70%. The gas balance, such as that between oxygen and hydrogen, has a large impact on the melting and vitrification temperature at the growth face. Moreover, in the practice of the invention, as striae are deliberately distributed periodically in the direction of silica growth, the high-temperature region on the melting face at the growth end of the ingot expands when supply of the starting material is interrupted. Hence, the melting face tends to have a difference between the maximum and minimum temperatures that is smaller than the temperature distribution during conventional feeding of the starting material. This stabilizes bonds in the layers between striae, and makes it even more possible to enlarge the region having an internal transmittance of at least 99.70%.

That is, we have found that, in the relationship of the melting and vitrification temperature at the growth face versus transmittance, the melting face temperature exerts an influence on the transmittance at wavelengths shorter than 200 nm, and particularly at the wavelength of ArF excimer laser light (193.4 nm). Specifically, at a higher melting and vitrification temperature, it is possible to maintain an internal transmittance of at least 99.70%. Moreover, within this range of conditions, it is also possible to maintain the hydrogen molecule content in the synthetic quartz glass at a level of at least $3 \times 10^{18}$ molecules/cm$^3$ and thus achieve good long-term stability during excimer laser irradiation. When the above molar ratio of actual oxygen to the stoichiometric amount of oxygen is less than 0.6, the temperature at the silica growth face declines, discouraging silica growth, which may result in an internal transmittance at 193.4 nm of less than 99.70%. The same holds true in cases where the molar mixing ratio of silica-forming starting compound and oxygen falls below 1.3 times the stoichiometric amount of oxygen.

The burner to which the silane compound, a combustible gas such as hydrogen and a combustion-supporting gas such as oxygen are fed may be a type of burner commonly used for this purpose, such as one in which the center portion has a multi-tube, and particularly a three-tube or five-tube, construction.

Striae can be formed by intermittently feeding the silica-forming starting compound under the above conditions. In the inventive process, each time the silica-forming starting compound has been supplied for a period of 10 to 60 minutes, and preferably 20 to 50 minutes, it is desirable to interrupt the supply of starting compound for a length of time corresponding to 1/20 to 1/1, and preferably 1/10 to 1/5, the length of the supply period. The visibility, or heaviness, of the striae is related to the length of time supply of the silica-forming starting compound is interrupted. A long period of interruption results in more clearly visible (heavier) striae. When supply is interrupted for more than 60 minutes, silica sublimation occurs, which may lower the rate of silica growth and reduce productivity.

Thus, the silica-forming starting compound is typically supplied continuously for perhaps 40 minutes, following which supply of the silica-forming starting compound is interrupted and the silica growth face is exposed to the oxyhydrogen flame and melted for perhaps 5 minutes. Supply of the silicon-forming starting material is then begun once again, and the above operation is repeated. This operation is automatically valve controlled with a sequencer and periodically repeated to produce the synthetic quartz glass ingot.

In the ingot produced by this method, the striae visible when viewed in a direction perpendicular to the direction of silica growth have a distribution of preferably at least one stria per centimeter in the direction of growth. The striae have a shape which is preferably axially symmetric about the center axis of the growth face and arches out toward the periphery. The striae in the synthetic quartz glass ingot thus obtained have a visibility which preferably meets striae grade B, grade C or grade D of U.S. military specification MIL-G-174B.

Because of the presence of striae, the above-described synthetic quartz glass ingot cannot, of course, be used directly in this state as a quartz glass material for making optical elements for ArF excimer laser exposure systems. First it should be homogenized, preferably by a zone melting process, so as to achieve homogenization in three directions.

The most preferred method of homogenization is that disclosed in JP-A 7-267662. This method is able to completely remove intentionally formed striae present in the ingot, giving a synthetic quartz glass body having striae grades in both the working direction and the off-axis direction which meet grade A, the highest grade, in U.S. military specification MIL-G-174B.

The homogenized ingot is then molded and subsequently annealed to give a synthetic quartz glass blank according to the invention. First, in the molding step, the synthetic quartz glass body that has been homogenized in three directions is molded into a generally cylindrical shape from which an optical element such as a lens can easily be made.

The molding step may be carried out by placing the homogenized quartz glass body in a high-purity graphite mold having a given inside diameter and heating the quartz glass-containing graphite mold in an electric furnace to a temperature of at least 1,800° C. so as to thermally deform the quartz glass body and render it into a generally cylindrical shape.

The most critical concern in this step is contamination during molding. The graphite used must be of a high-purity grade. Yet, even high-purity graphite often contains a level of impurities high enough to lower the transmittance of the quartz glass to UV light. It is therefore essential that molding be carried out under conditions selected so as to minimize the migration of impurities into the glass.

Conditions suitable for molding include having the quartz glass remain in contact with the mold at an elevated temperature for as short a period of time as possible. Contamination is thus minimized by carrying out molding rapidly at a somewhat high molding temperature while applying a load to the quartz glass.

The resulting molded body is then ground to remove peripheral areas that were in contact with the graphite during the molding step. The thickness of the outermost layer of quartz glass that should be removed varies depending on the purity of the graphite and the molding conditions, but generally ranges from 1 to 15 mm, and preferably from 5 to 10 mm.

If production proceeds directly to the next step of annealing without removal of the outermost impurity-containing layer, extended heat treatment may cause the impurities to diffuse deep into the quartz glass body, lowering the UV light transmittance of the synthetic quartz glass body as a whole.

The resulting synthetic quartz glass molded body is then annealed so as to set the fictive temperature, adjust the hydrogen concentration, and remove distortion.

The fictive temperature of the synthetic quartz glass can be set by first holding the body at a high temperature to homogenize the fictive temperature distribution within the body, then annealing the body.

A minimum temperature and time are required to homogenize the fictive temperature. Holding the quartz glass body at an elevated temperature of at least 1,150° C. for about 20 hours should enable sufficient homogenization of the fictive temperature within even a relatively large quartz glass body. Moreover, because a temperature of 1,150° C. exceeds the annealing point of the synthetic quartz glass, distortion in the quartz glass can be removed by following this operation with an annealing step.

Care must be taken in setting the hydrogen concentration. Hydrogen diffuses quite rapidly in synthetic quartz glass at a temperature of 1,150° C. Holding the quartz glass at this temperature for too long will reduce its hydrogen concentration to a level below that needed to maintain sufficient stability to excimer laser irradiation.

A hydrogen concentration of at least $2 \times 10^{17}$ molecules/ $cm^3$ is desirable for ensuring good stability to laser irradiation. It is thus necessary to carefully select the holding temperature, holding time and cooling rate used in the annealing step based on the hydrogen concentration within the quartz glass molded body and the shape of the body prior to the start of annealing.

The synthetic quartz glass blank of the invention should have a hydrogen concentration of at least $2 \times 10^{17}$ molecules/$cm^3$ to maintain sufficient laser durability. To ensure that such a concentration is in fact achieved in the blank, the ingot must have a hydrogen concentration of at least $1 \times 10^{18}$ molecules/$cm^3$, and preferably at least $3 \times 10^{18}$ molecules/$cm^3$. It should be noted that this value is for cases where the necessary hydrogen molecules are introduced into the quartz glass during quartz glass ingot production. This method of incorporating the necessary hydrogen molecules within quartz glass is industrially preferred, both for its stability and cost-effectiveness.

However, under conditions which lead to the inclusion of an excessive amount of hydrogen during formation of the synthetic quartz glass ingot, i.e., where the flame which generates the fine particles of silica is a reducing flame, numerous reducing defects (e.g., Si—H) arise in the growing synthetic quartz glass. Such defects may result in a sudden drop in transmittance immediately following irradiation with an excimer laser. The E' centers which arise from the decay of these defects are of a somewhat different nature than the E' centers which form under long-term exposure to excimer laser light. Namely, they abruptly vanish when laser irradiation is stopped. Accurate values can thus be obtained only by measuring the synthetic quartz glass transmittance during excimer laser irradiation.

However, the quantity of such reducing defects present in synthetic quartz glass cannot be determined without actually exposing the quartz glass to laser light. An expedient alternative is to estimate this quantity by means of other physical values which emerge under the growth conditions conducive to the formation of reducing defects and are readily quantifiable in synthetic quartz glass.

The physical values most often used for this purpose are the hydroxyl group concentration and the hydrogen molecule concentration. When the ingot growth conditions are reducing, the hydroxyl group concentration decreases and the hydrogen molecule concentration increases. By measuring these concentrations, it is possible to estimate, albeit indirectly, the concentration of reducing defects present in the resulting synthetic quartz ingot.

Given the above, it has previously been thought that numerous reducing defects form unless the hydroxyl group concentration is more than 1,000 ppm. However, we have found that when a synthetic quartz glass ingot is grown using a process like that described in the invention, where periodic striae are formed by interrupting supply of the starting material at fixed intervals during growth of the quartz glass, very few reducing defects form at a hydroxyl group concentration of at least 700 ppm, and preferably at least 800 ppm. It has also become apparent that by setting the fictive temperature of the quartz glass to a suitable value as described subsequently, the sudden drop in transmittance observed at the start of ArF excimer laser irradiation can be held to a level that is acceptable for practical purposes.

This change in transmittance that appears at the start of ArF excimer laser irradiation depends on the energy and frequency of the laser radiation. That is, the amount of absorption increases at higher ArF excimer laser radiation energy and at higher frequency.

Based on our own investigations, we have reached the conclusion that, at an energy density (e.g., 0.05 mJ/$cm^2$) and frequency (e.g., 1 kHz) typical of lasers used in actual ArF excimer laser exposure systems, synthetic quartz glass which, after irradiation with 30,000 pulses of ArF excimer laser light at an energy density per pulse of 2 mJ/$cm^2$ and a frequency of 200 Hz, has a transmittance to the laser light that is at least 98.0%, preferably at least 99.0%, and most preferably at least 99.3%, is entirely acceptable for practical purposes.

At the same time, it is known that the change in transmittance by quartz glass which occurs with long-term irradiation by an ArF excimer laser diminishes in inverse proportion to the square of the laser irradiation energy. Accordingly, the degree of absorption that is acceptable for practical purposes is one where the quartz glass, when irradiated with $2 \times 10^6$ pulses of ArF excimer laser light at an energy density per pulse of 2 mJ/$cm^2$ and a frequency of 200 Hz, has a transmittance to the laser light that is at least 97.5%, preferably at least 98.0%, and most preferably at least 98.5%. We have learned that the hydrogen molecule concentration in the quartz glass is an important factor in achieving such a degree of transmittance, and that these levels can be achieved at a hydrogen molecule concentration of at least $5 \times 10^{17}$ molecules/$cm^3$, and preferably at least $1 \times 10^{18}$ molecules/$cm^3$.

To introduce at least $3 \times 10^{18}$ molecules/$cm^3$ of hydrogen into the ingot, growth of the synthetic quartz glass must be carried out in a reducing atmosphere. In conventional growth processes, reducing defects arise when the growth conditions fall outside the allowable range of values. However, we have found that when use is made of a method for producing ingots having periodic striae as in the present invention, the formation of reducing defects can be suppressed even at such a high concentration of hydrogen molecules. In fact, we know that the upper limit in the hydrogen molecule concentration which can be achieved without generating reducing defects is $5 \times 10^{18}$ molecules/$cm^3$, and that the final hydrogen molecule concentration obtained by subjecting such a synthetic quartz glass ingot to necessary heat treatment such as homogenization is about $3 \times 10^{18}$ molecules/$cm^3$.

On the other hand, if a final synthetic quartz glass blank contains a higher hydrogen molecule concentration than this, there is a possibility that reducing defects will have arisen in the glass. The appropriate concentration of hydrogen molecules present in the synthetic quartz glass blank, expressed as an average in the working direction, is thus preferably at least $2 \times 10^{17}$ molecules/$cm^3$ but not more than $3 \times 10^{18}$ molecules/$cm^3$, and most preferably at least $5 \times 10^{17}$ molecules/$cm^3$ but not more than $2 \times 10^{18}$ molecules/$cm^3$.

The fictive temperature, which has a large influence on the refractive index homogeneity and laser durability of the quartz glass, can be set by means of an annealing step. The optimal range in the fictive temperature is selected with particular reference to the laser durability.

It was noted above that by forming periodic striae during growth of the synthetic quartz glass ingot, a laser durability sufficient for practical purposes can be achieved even under growth conditions that provide a hydroxyl group concentration in the resulting ingot of about 700 ppm and a hydrogen molecule concentration of about $5 \times 10^{18}$ molecules/$cm^3$. Even so, it is in practice important to set the fictive temperature within a suitable range.

Although it is unclear whether suitable selection of the fictive temperature lowers the reducing defect concentration within the synthetic quartz glass or alters the speed at which reducing defects are cleaved by excimer laser light, we do know that quartz glasses having a fictive temperature higher than 1,000° C., even when otherwise endowed with exactly the same properties, exhibit a larger absorption immediately after ArF excimer laser irradiation.

Specifically, we have discovered that even in synthetic quartz glass having a certain amount of reducing defects, the sudden change in initial transmittance observed with excimer laser irradiation can be reduced to a practically acceptable level by setting the fictive temperature to not more than 1,000° C., preferably not more than 980° C., and most preferably not more than 950° C.

To minimize such sudden changes in initial transmittance during laser irradiation, it is preferable for the fictive temperature of the quartz glass to be as low as possible. However, lowering the fictive temperature requires an exponential slowing of the cooling rate, thus placing practical limits on what is possible.

Bearing in mind heat treatment-related effects, including the loss of hydrogen molecules from the quartz glass and the influence of impurities which diffuse into the quartz glass, the lower limit value for the fictive temperature should be 850° C. In addition, it is preferable for the synthetic quartz glass blank of the invention to have an alkali metal content, and especially a sodium content, of not more than 20 ppm.

EXAMPLES

The following examples are provided to illustrate the invention, and are not intended to limit the scope thereof.

Measurements of the hydroxyl group concentration, transmittance, birefringence, period and visibility of the striae, fictive temperature, and hydrogen molecule concentration in the examples were carried out as follows.

Hydroxyl Group Concentration

Measured using infrared spectrophotometry. Specifically, the extinction coefficient of light at a wavelength of 4522 $cm^{-1}$ was determined by Fourier transform infrared spectrophotometry. The following conversion formula was used:

OH group concentration (ppm)=extinction coefficient at 4522 $cm^{-1} \times 4,400$.

Internal Transmittance

Measured by ultraviolet spectrophotometry.

Birefringence

Measured using an EXICOR 350AT birefringence measurement system made by Hinds Instruments.

Fictive Temperature

Measured by laser Raman spectrophotometry according to the method described in *The American Physical Society* 28, No. 6, 3266–3271 (September 1983).

Striae

Measured using a Schlieren instrument, in accordance with U.S. military specification MIL-G-174B.

Hydrogen Molecule Concentration

Measured by laser Raman spectrophotometry according to the method described in *Zhurnal Prikland noi Spektroskopii* 46, No. 6, 987–991 (1987). Measurement was carried out by photon counting using a JASCO NR-1000 laser Raman spectrometer and a Hamamatsu Photonics R943-02 photomultiplier. In measurement of the hydrogen molecule concentration by argon laser Raman spectrophotometry, the measured values vary with the sensitivity curve of the detector. Values must thus be calibrated using a reference sample.

Example 1

A synthetic quartz glass ingot was produced by feeding methyltrimethoxysilane to a quartz burner, flame hydrolyzing the silane in an oxyhydrogen flame to form fine particles of silica, then depositing and at the same time melting and vitrifying the silica particles on a rotating quartz glass target.

Referring to FIG. 4, a quartz glass target 2 was mounted on a rotating support 1. Argon 5 was introduced into the methyltrimethoxysilane 4 held in a starting material vaporizer 3. Methyltrimethoxysilane 4 vapor was carried out of the vaporizer by the argon 5, and oxygen 6 was added to the silane-laden argon to form a gas mixture, which was then fed to the center nozzle of a quartz burner 7. The burner 7 was also fed the following gases, in outward order from the foregoing gas mixture at the center: oxygen 8, hydrogen 9, hydrogen 10, and oxygen 11. The silane starting material and an oxyhydrogen flame 12 were discharged from the burner 7 toward the target 2. Fine particles of silica 13 were deposited on the target 2 and simultaneously melted and vitrified as clear glass, forming a synthetic quartz glass ingot 14. The production conditions used are shown in Table 1.

The synthetic quartz glass ingot thus obtained had a diameter of 140 mm and a length of 1,000 mm. During growth of the ingot, 1.25 striae per centimeter were formed by repeatedly feeding the starting material to the flame for a period of 50 minutes, then interrupting supply of the starting material for a period of 10 minutes. The striae had a visibility which conformed to grade B of U.S. military specification MIL-G-174B.

TABLE 1

| | Starting material feed period (min) | Starting material interruption period (min) | Period of striae (striae/cm) | Visibility of striae (grade) | OH group concentration (ppm) | | Transmittance (193.4 nm) (%) | After homogenization | |
|---|---|---|---|---|---|---|---|---|---|
| | | | | | min | max | | Δn (×10⁻⁶) | Birefringence (nm/cm) |
| Example 1 | 50 | 10 | 1.25 | 3 | 720 | 930 | 99.78 | 0.7 | 0.8 |

A sample was cut from the resulting synthetic quartz glass ingot in such a way as to exclude striae as much as possible, and the following characteristics were measured: hydrogen molecule concentration, hydroxyl group concentration, internal transmittance to 193.4 nm UV light, and change in transmittance to 193.4 nm light when irradiated with an ArF excimer laser.

The change in transmittance when irradiated with an ArF excimer laser was measured while carrying out laser irradiation. ArF excimer laser irradiation conditions: energy density per pulse, 2 mJ/cm²; frequency, 200 Hz; 30,000 pulses.

The measured values for the ingot are given in Table 2.

TABLE 2

| | Hydrogen molecule concentration | OH group concentration | Internal transmittance at 193.4 nm | Transmittance during laser irradiation |
|---|---|---|---|---|
| Maximum | 4 × 10¹⁸ molecules/cm³ | 960 ppm | 99.83% | 97.5% |
| Minimum | 2 × 10¹⁸ molecules/cm³ | 880 ppm | 99.77% | 96.8% |

The internal transmittance at 193.4 nm values shown in Table 2 were obtained by dividing the measured transmittance of the synthetic quartz glass sample to UV light having a wavelength of 193.4 nm by the theoretical transmittance of quartz glass to 193.4 nm light (90.85%).

The synthetic quartz glass ingot obtained as described above was subjected to homogenization by the following zone melting process. Both ends of the ingot were welded to synthetic quartz glass supporting rods held in a lathe and the ingot was drawn and elongated. One end of the ingot was then strongly heated with an oxyhydrogen burner so as to form a melt zone. Next, the left and right chucks were rotated at different speeds to apply shear stress to the melt zone, thereby homogenizing the quartz glass ingot. At the same time, the burner was moved from one end of the ingot to the other end so as to homogenize the hydroxyl group concentration and hydrogen concentration within the ingot growth plane.

This operation was repeated four times (two full back-and-forth cycles) over the full length of the ingot, thereby homogenizing the entire ingot.

Next, the ingot was compressed in the axial direction on the lathe into a generally cylindrical shape having a diameter of 200 mm and a length of 400 mm. The ingot was then cut free of the supporting rods, set in a high-purity graphite mold having internal dimensions of 200×200×400 mm within a melting furnace. The furnace temperature was raised to 1,800° C. and held at that temperature for one hour, following which the power was shut off and the furnace was allowed to cool down. The quartz glass body was in this way molded into a synthetic quartz glass rod measuring 200×200×300 mm.

The surface of the resulting synthetic quartz glass rod was ground down to a depth of 5 mm to remove contamination from the graphite, then etched for one hour with 50% hydrofluoric aid. The synthetic quartz glass rod obtained from this step had dimensions of 190×190×290 mm.

The hydrofluoric acid-washed synthetic quartz glass rod was welded once again at both ends in the longitudinal direction (the direction having a length of 290 mm) to synthetic quartz glass supporting rods held in a lathe. The entire synthetic quartz glass rod was then thoroughly melted and heated while moving the left and right chucks on the lathe further apart and rotating the two chucks at somewhat different speeds so as to transform the rod into a cylindrical shape and at the same time elongate it. After obtaining in this way a quartz glass ingot having a diameter of 100 mm and a length of 1,330 mm, the ingot was subjected to one full back-and-forth homogenization cycle by the zone melting process.

Next, the ingot was compressed in the axial direction on the lathe into a generally cylindrical shape having a diameter of 200 mm and a length of 300 mm. The ingot was then cut free of the supporting rods, set in a high-purity graphite mold having internal dimensions of 310 mm (diameter)×300 mm (height) within a melting furnace. The furnace temperature was raised to 1,800° C. and held at that temperature for one hour, following which the power was shut off and the furnace was allowed to cool down. The quartz glass body was in this way molded into a synthetic quartz glass disk measuring 310 mm (diameter)×120 mm (thickness).

The surface of the resulting synthetic quartz glass disk was ground down to a depth of 5 mm to remove contamination from the graphite, then etched for one hour with 50% hydrofluoric aid. The synthetic quartz glass rod obtained from this step had dimensions of 300 mm (diameter)×110 mm (thickness).

Annealing was then carried out. The synthetic quartz glass disk was placed in a synthetic quartz glass container having an outside diameter of 400 mm, an inside diameter of 304 mm, a height of 140 mm, and a depth of 130 mm. The loaded container was closed with a 10 mm thick synthetic quartz glass plate as the lid and set in an upright position within an electric furnace. The furnace was held at 1,150° C. for 40 hours, then cooled at a cooling rate of 2° C./h to 920° C. and held at 920° C. for 24 hours. The furnace was subsequently shut off and allowed to cool down to room temperature.

To eliminate the influence of impurities from the annealing process, 20 mm was ground from the peripheral surface of the annealed synthetic quartz glass disk in the radial direction and 10 mm was ground from each of the two faces in the thickness direction, finally resulting in a diameter of 260 mm and a thickness of 90 mm.

The refractive index homogeneity of the resulting synthetic quartz glass blank was measured in both the working direction and the off-axis direction. The birefringence in the working direction and in the off-axis direction were also measured.

Samples were cut from the synthetic quartz glass blank and used to measure the transmittance to 193.4 nm wavelength UV light, metallic impurity concentrations, hydroxyl group concentration, hydrogen molecule concentration, and fictive temperature of the quartz glass. In addition, 10 mm thick samples were used to measure striae in the working direction and the off-axis direction with a Schlieren instrument according to the method described in U.S. military specification MIL-G-174B.

Table 3 below shows the results obtained for internal transmittance to 193.4 nm UV light and metallic impurity concentrations in different areas of the synthetic quartz glass disk obtained in Example 1.

TABLE 3

Transmittance and impurity concentrations for synthetic quartz glass disk in Example 1.

| Area of disk from which sample was taken | Internal transmittance (%) | Concentrations of metallic impurities (ppb) | | | | | | |
|---|---|---|---|---|---|---|---|---|
| | | Li | Na | Mg | Al | K | Ca | Ti, Cr, Fe, Ni, Cu, Mo, W, V, Zn |
| Top periphery | 99.74 | 2 | 15 | 2 | 3 | 3 | 2 | each element <2 |
| Top center | 99.75 | <2 | 13 | <2 | <2 | 2 | <2 | each element <2 |
| Middle periphery | 99.74 | <2 | 15 | <2 | 2 | <2 | <2 | each element <2 |
| Middle center | 99.76 | <2 | 10 | <2 | <2 | <2 | <2 | each element <2 |
| Bottom periphery | 99.73 | 3 | 18 | 2 | 4 | 3 | 2 | each element <2 |
| Bottom center | 99.74 | 3 | 16 | <2 | 3 | 2 | <2 | each element <2 |

Table 4 shows the Δn values, maximum birefringences, and striae grades in the working direction and off-axis direction for the synthetic quartz glass disk obtained in Example 1.

TABLE 4

Optical characteristics of synthetic quartz glass disk in Example 1.

| Direction | Δn | Maximum birefringence | Striae grade |
|---|---|---|---|
| Working direction | $1 \times 10^{-6}$ | 1.0 nm/cm | A |
| Off-axis direction | $2 \times 10^{-6}$ | 1.0 nm/cm | A |

Tables 5 and 6 show the hydrogen molecule concentrations and fictive temperatures of the synthetic quartz glass disk obtained in Example 1.

TABLE 5

OH group concentrations, fictive temperatures and hydrogen molecule concentrations averaged in off-axis direction at various positions in working direction, for synthetic quartz glass disk in Example 1.

| Position in working direction (mm) | −120 | −80 | −40 | 0 | 40 | 80 | 120 |
|---|---|---|---|---|---|---|---|
| Average OH group concentration (ppm) | 935 | 936 | 939 | 941 | 938 | 935 | 934 |
| Average fictive temperature (° C.) | 912 | 915 | 917 | 918 | 917 | 915 | 912 |
| Average hydrogen concentration (molecules/cm³) | $8.27 \times 10^{17}$ | $1.34 \times 10^{18}$ | $1.57 \times 10^{18}$ | $1.63 \times 10^{18}$ | $1.57 \times 10^{18}$ | $1.39 \times 10^{18}$ | $8.25 \times 10^{17}$ |

TABLE 6

OH group concentrations, fictive temperatures and hydrogen molecule concentrations averaged in working direction at various positions in off-axis direction, for synthetic quartz glass disk in Example 1.

| Position in off-axis direction (mm) | −39 | −26 | −13 | 0 | 13 | 26 | 39 |
|---|---|---|---|---|---|---|---|
| Average OH group concentration (ppm) | 933 | 936 | 939 | 940 | 939 | 937 | 934 |

TABLE 6-continued

OH group concentrations, fictive temperatures and hydrogen molecule concentrations averaged in working direction at various positions in off-axis direction, for synthetic quartz glass disk in Example 1.

| Average fictive temperature (° C.) | 908 | 913 | 917 | 919 | 917 | 913 | 908 |
|---|---|---|---|---|---|---|---|
| Average hydrogen concentration (molecules/cm$^3$) | 7.23 × 10$^{17}$ | 1.20 × 10$^{18}$ | 1.66 × 10$^{18}$ | 1.73 × 10$^{18}$ | 1.60 × 10$^{18}$ | 1.19 × 10$^{18}$ | 7.20 × 10$^{17}$ |

Table 7 shows the transmittance of the synthetic quartz glass disk obtained in Example 1 when irradiated with an ArF excimer laser.

TABLE 7

Initial transmittance (transmittance when irradiated with 30,000 pulses at 2 mJ/cm$^2$ per pulse and 200 Hz) and long-term transmittance (transmittance when irradiated with 2 × 10$^6$ pulses at 2 mJ/cm$^2$ per pulse and 200 Hz) to ArF excimer laser light.

|  | Top periphery | Top center | Middle periphery | Middle center | Bottom periphery | Bottom center |
|---|---|---|---|---|---|---|
| Initial transmittance (%) | 99.6 | 99.1 | 99.3 | 99.0 | 99.4 | 99.2 |
| Long-term transmittance (%) | 99.5 | 99.6 | 99.5 | 99.7 | 99.5 | 99.6 |

As described above and demonstrated in the foregoing examples, the invention provides synthetic quartz glass blanks which have a good transmittance to laser light, undergo little deterioration when irradiated with laser light, and are particularly suitable for ArF excimer laser-related applications.

Japanese Patent Application No. 2001-376646 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A synthetic quartz glass blank which is obtained by homogenizing a synthetic quartz glass ingot having periodic striae in a direction of growth, has a generally cylindrical shape with a diameter of 150 to 380 mm and a thickness of 50 to 150 mm, and contains substantially no chlorine; wherein the blank has:
    (a) striae grades in a working direction and an off-axis direction which meet grade A of U.S. military specification MIL-G-174B,
    (b) a working direction hydroxyl group concentration averaged in the off-axis direction and an off-axis direction hydroxyl group concentration averaged in the working direction of 700 to 1,000 ppm each,
    (c) a working direction fictive temperature averaged in the off-axis direction and an off-axis direction fictive temperature averaged in the working direction of 850 to 950° C. each, and
    (d) a refractive index distribution Δn for 633 nm wavelength light in the working direction of the synthetic quartz glass of at most 1×10$^{-6}$.

2. The synthetic quartz glass blank of claim 1 which, after irradiation with 30,000 pulses of ArF excimer laser light at an energy density per pulse of 2 mJ/cm$^2$ and a frequency of 200 Hz, has a laser light transmittance that is at least 98.0% of the transmittance before laser irradiation and, after irradiation with 2×10$^6$ pulses of ArF excimer laser light under the same conditions, has a transmittance of at least 97.5%.

3. The synthetic quartz glass blank of claim 1 which has an average hydrogen molecule concentration in the working direction of 2×10$^{17}$ to 3×10$^{18}$ molecules/cm$^3$.

4. The synthetic quartz glass blank of claim 1, wherein the striae on the ingot from which the blank is obtained are distributed periodically in the growth direction to a density of at least one striae per centimeter.

5. The synthetic quartz glass blank of claim 4, wherein the striae are located at positions where feeding of a silica-forming starting compound is interrupted during growth of the ingot.

6. The synthetic quartz glass blank of claim 1, wherein the ingot from which the blank is obtained is repeatedly homogenized in the growth direction and in a direction perpendicular to the growth direction.

* * * * *